US008919706B2

(12) United States Patent  
Alden et al.

(10) Patent No.: US 8,919,706 B2
(45) Date of Patent: Dec. 30, 2014

(54) GAS MANIFOLD BRACKET FOR GAS GRILL

(75) Inventors: J. Michael Alden, Palatine, IL (US); Paul Robert Behnke, Mount Prospect, IL (US)

(73) Assignee: Weber-Stephen Products LLC, Palatine, IL (US)

( * ) Notice: Subject to any disclaimer, the term of this patent is extended or adjusted under 35 U.S.C. 154(b) by 148 days.

(21) Appl. No.: 13/463,436

(22) Filed: May 3, 2012

(65) Prior Publication Data

US 2013/0292520 A1 Nov. 7, 2013

(51) Int. Cl.
*F16L 3/00* (2006.01)
*F24C 5/00* (2006.01)

(52) U.S. Cl.
USPC .............. 248/73; 248/65; 248/72; 248/213; 248/211; 248/215; 248/301; 248/304; 126/50; 126/40; 126/39 N; 126/39 E; 126/39 J; 126/9 R; 126/55; 126/91 A; 126/41 R; 126/38; 126/41 B; 126/39 R; 126/25 R; 431/343

(58) Field of Classification Search
USPC ............... 248/73, 65, 72, 213, 211, 215, 301, 248/304; 126/50, 40, 39 N, 39 E, 39 J, 9 R, 126/55, 91 A, 41 R, 38, 39 R, 25 R, 41 B; 431/343
See application file for complete search history.

(56) References Cited

U.S. PATENT DOCUMENTS

| 3,174,628 | A | | 3/1965 | Kirch | |
| 4,677,964 | A | | 7/1987 | Lohmeyer | |
| 5,109,834 | A | * | 5/1992 | Collins et al. | 126/41 R |
| 5,245,917 | A | | 9/1993 | Schlosser | |
| 5,253,837 | A | | 10/1993 | Loux | |
| 5,873,355 | A | * | 2/1999 | Schlosser et al. | 126/41 R |
| 6,131,562 | A | | 10/2000 | Schlosser | |
| 6,422,230 | B1 | * | 7/2002 | Stewart et al. | 126/25 R |
| 7,207,326 | B2 | * | 4/2007 | McKenzie et al. | 126/39 N |
| 2003/0213484 | A1 | * | 11/2003 | Alden et al. | 126/41 R |
| 2004/0065312 | A1 | * | 4/2004 | Choi et al. | 126/25 R |
| 2008/0216813 | A1 | | 9/2008 | Pai | |
| 2012/0073560 | A1 | * | 3/2012 | Parrish | 126/25 R |

FOREIGN PATENT DOCUMENTS

WO 2008125258 A2 10/2008

OTHER PUBLICATIONS

P. 1, lines 6-23 of the Background of the Invention section of the specification of the present application (13463436) constitutes prior art.

* cited by examiner

*Primary Examiner* — Christopher Garft
(74) *Attorney, Agent, or Firm* — Niro Haller & Niro

(57) ABSTRACT

A gas distribution mounting bracket for gas grills that simultaneously secures a gas distribution manifold to the fire box and support frame of the gas grill.

6 Claims, 5 Drawing Sheets

GAS MANIFOLD BRACKET FOR GAS GRILL

FIELD OF THE INVENTION

The present inventions relate to gas grills. More particularly, the present inventions relate to mounting brackets that secure the gas distribution manifold to both the fire box and grill frame.

BACKGROUND OF THE INVENTION

Many available gas grills typically include a support frame or cart, often with wheels and shelves for accessories and the like. They also include a cooking chamber or fire box having a hinged lid. The fire box accommodates the gas distribution components, such as the burner tubes, cooking grates and the like. Other gas distribution components, such as the valves and manifold, are typically attached to the burner tubes. The fire box is attached to and sits on the support frame.

Many gas grills are sold in a partially disassembled state for ease of shipping and are to be assembled by the consumer. Typically, the fire box, including the gas distribution components, is packaged and shipped as one complete subassembly. This is done for safety reasons and particularly, so that the consumer is only required to make a minimum of gas supply and/or distribution connections. The support frame, on the other hand, typically requires more assembly by the consumer. Once the support frame is assembled, the fire box and its gas distribution components are placed on the frame and attached thereto.

In typical gas grills, a gas distribution manifold, which is the component that distributes the gas through the valves and to the burners, is typically supported by one or more brackets that mount the manifold (which in turn helps support the valves and burner tubes) only to the fire box. While this arrangement is adequate for many situations, more stability and support for the gas manifold and associated components may be desirable.

Therefore, it is an object of the present inventions to stabilize the gas distribution manifold when the gas grill is assembled, while still permitting ease of assembly by the consumer without the need for specialized tools.

It is an additional object of the present inventions to simultaneously mount the gas distribution manifold to the fire box and the grill support frame.

It is a further object of the present invention to produce gas distribution manifold mounting brackets that secure the gas distribution manifold to the grill frame and the fire box for additional security and stability.

NOTICE OF CLAIM OF COPYRIGHT PROTECTION

A portion of the disclosure and drawings of this patent document contains material which is subject to copyright protection. The copyright owner has no objection to the facsimile reproduction by anyone of the patent document or the patent disclosure, as it appears in the U.S. Patent and Trademark Office files or records, but otherwise reserves all rights.

SUMMARY OF THE INVENTION

The present inventions preserve the advantages of known gas grills and also provide new features and advantages.

More particularly, the present inventions provide a mounting bracket for a gas distribution manifold for a gas grill, the grill including a fire box and support frame. The mounting bracket includes a first end adapted to support a gas distribution manifold, a second end adapted to be attached to a wall of the fire box and an intermediate portion adapted to be secured to the support frame. The present inventions may also include a plurality of mounting brackets to support the gas distribution manifold. In addition, the second end of the mounting bracket may have an attachment portion that is at a right angle to the bracket and parallel to the fire box. The present inventions may also include a mounting bracket that is unitary, i.e., wherein the first end, second end and intermediate portion are formed from a single piece of metal or other suitable fire or heat resistant material.

The present inventions also provide a mounting bracket for securing a gas distribution manifold to the fire box and support frame of a gas grill, including three portions. Specifically, the mounting bracket includes a manifold support portion for supporting a gas distribution manifold, a fire box attachment portion for securing the bracket to the fire box and a frame attachment portion for securing the bracket to the grill support frame.

INVENTOR'S DEFINITION OF THE TERMS

The terms used in the claims of this patent are intended to have their broadest meaning consistent with the requirements of law. Where alternative meanings are possible, the broadest meaning is intended. All words used in the claims are intended to be used in the normal, customary usage of grammar and the English language. Where alternative meanings are possible, in either the specification or claims, the broadest meaning is intended. All words used in the claims are intended to be used in the normal, customary usage of grammar, the trade and the English language.

BRIEF DESCRIPTION OF THE DRAWINGS

The stated and unstated objects, features and advantages of the present inventions (sometimes used in the singular, but not excluding the plural) will become apparent from the following descriptions and drawings, wherein like reference numerals represent like elements in the various views, and in which.

DETAILED DESCRIPTION OF PREFERRED EMBODIMENTS

Set forth below is a description of what is currently believed to be the preferred embodiments or best representative examples of the inventions claimed. Future and present alternatives and modifications to the embodiments and preferred embodiments are contemplated. Any alternatives or modifications which make insubstantial changes in function, purpose, structure or result are intended to be covered by the claims of this patent.

Figure 1:
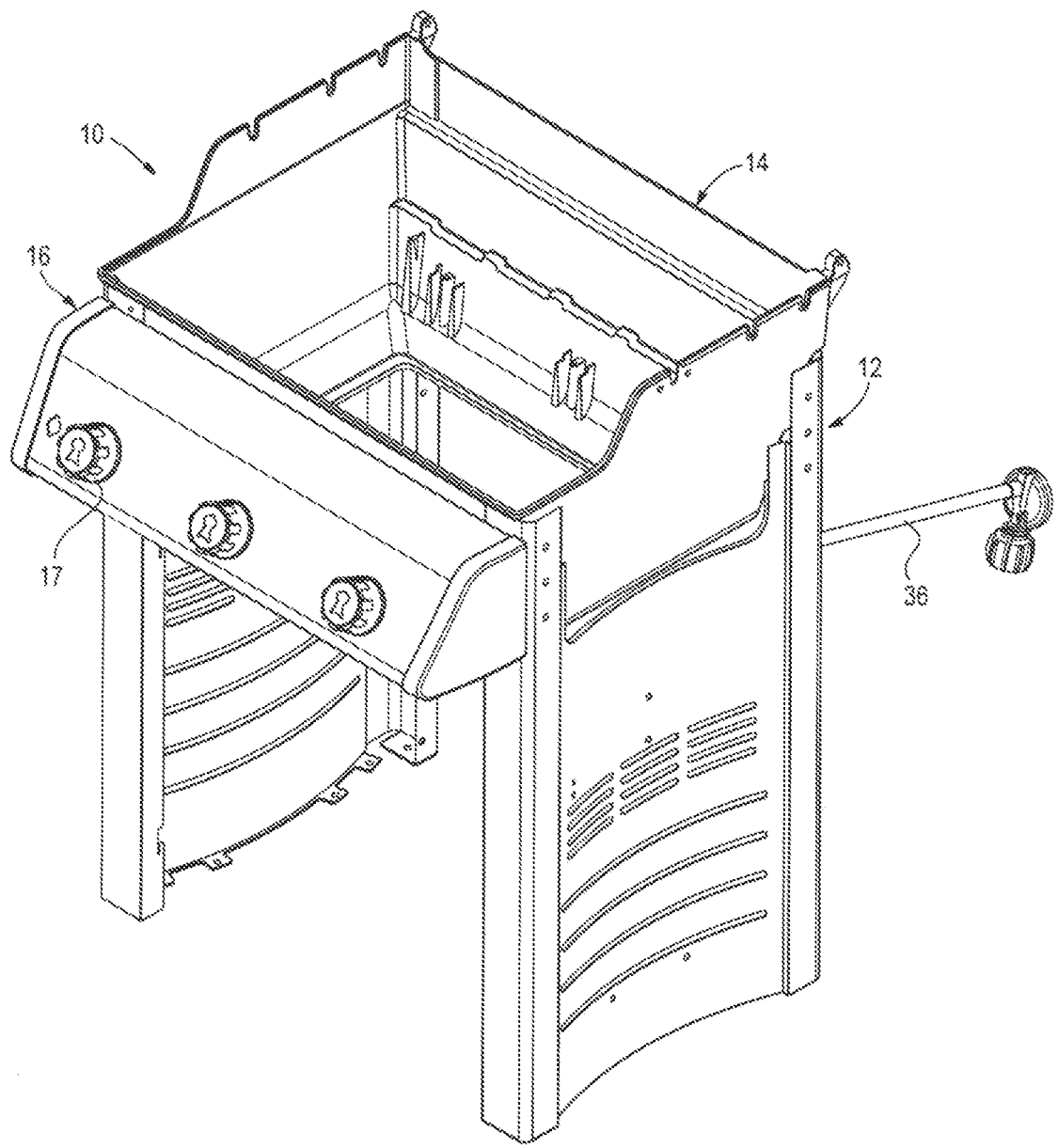
FIG. 1 is a perspective view of a representative gas grill, shown without the lid.

A representative gas grill to which the present inventions may apply is shown generally as 10 in FIG. 1. It includes a support frame assembly 12 and a fire box or cooking chamber 14 having a hinged lid (not shown). A control panel 16 and knobs 17 to operate the gas valves 33 (not shown in FIG. 1) are also provided. The fire box 14 is supported by and attached to frame 12 in a manner that is understood by those of ordinary skill in the art.

Figure 2:
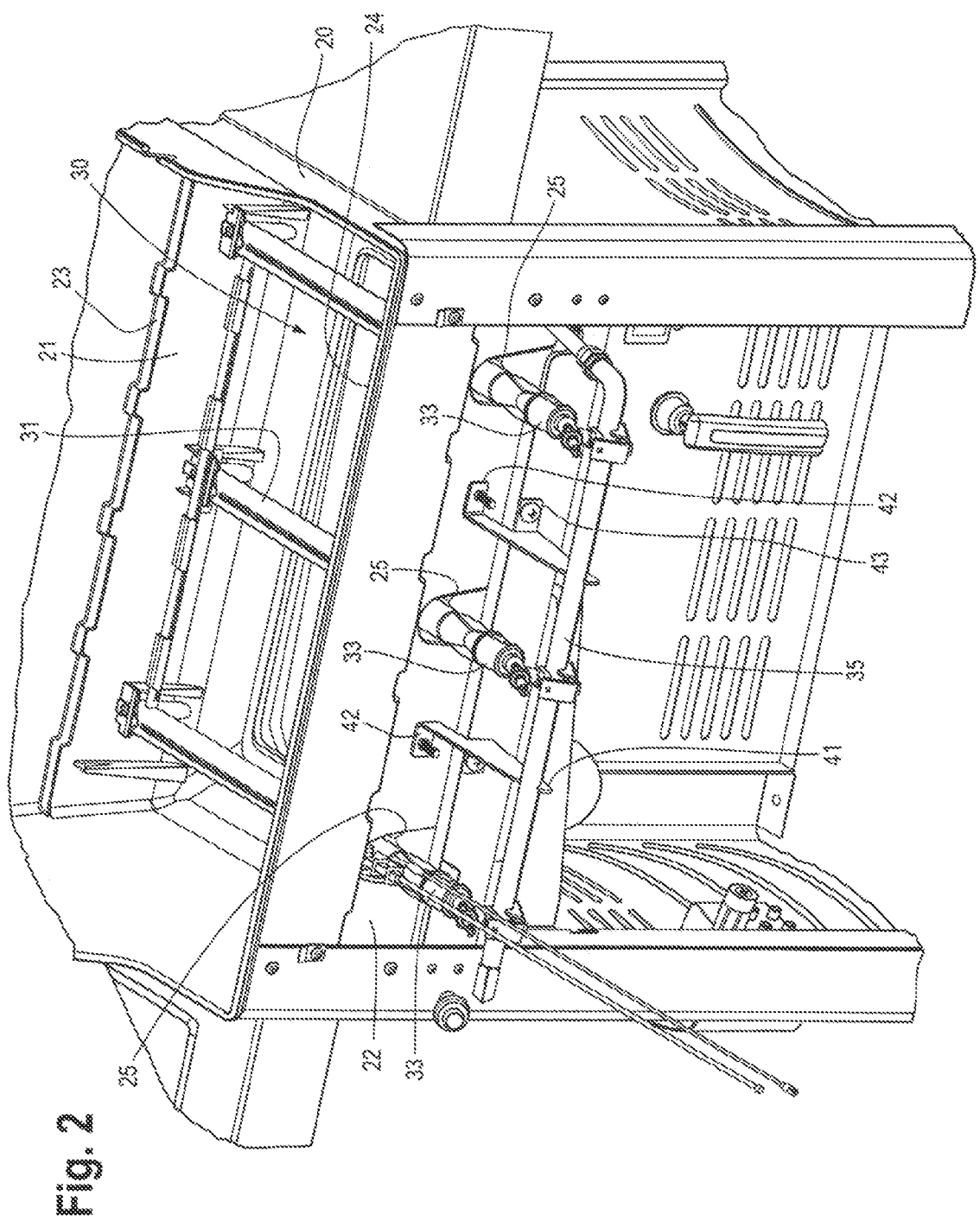
FIG. 2 is a perspective view of portions of the representative gas grill of FIG. 1, with the control panel and other components removed to show the gas supply and distribution components and a preferred embodiment of a manifold mounting bracket of the present invention shown attached to both the fire box and grill support frame.
Figure 3:
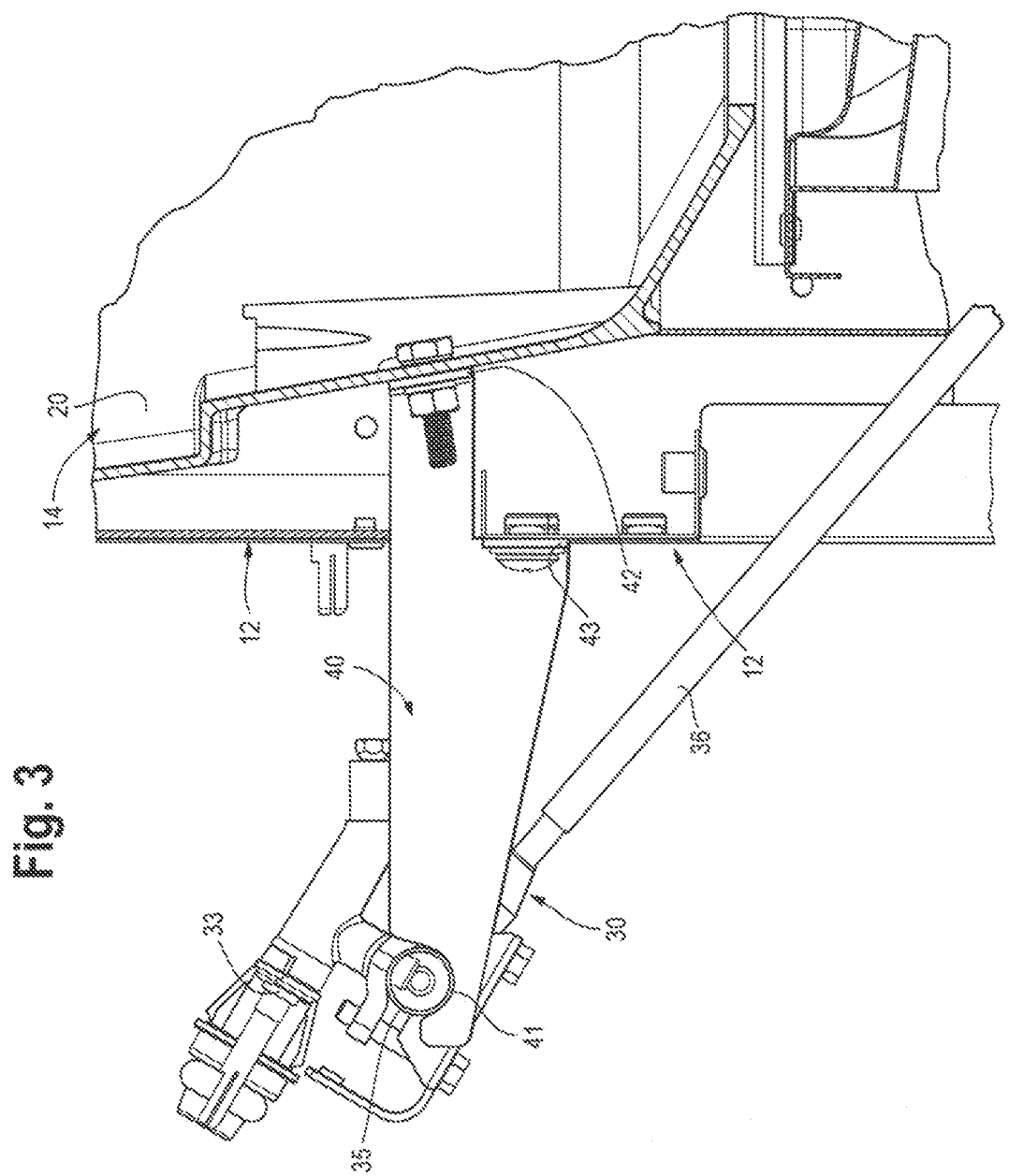
FIG. 3 is a side or lateral view of the components of FIG. 2, including a preferred embodiment of the mounting bracket of the present invention shown secured to the fire box and to the support frame of a gas grill.
Figure 4:
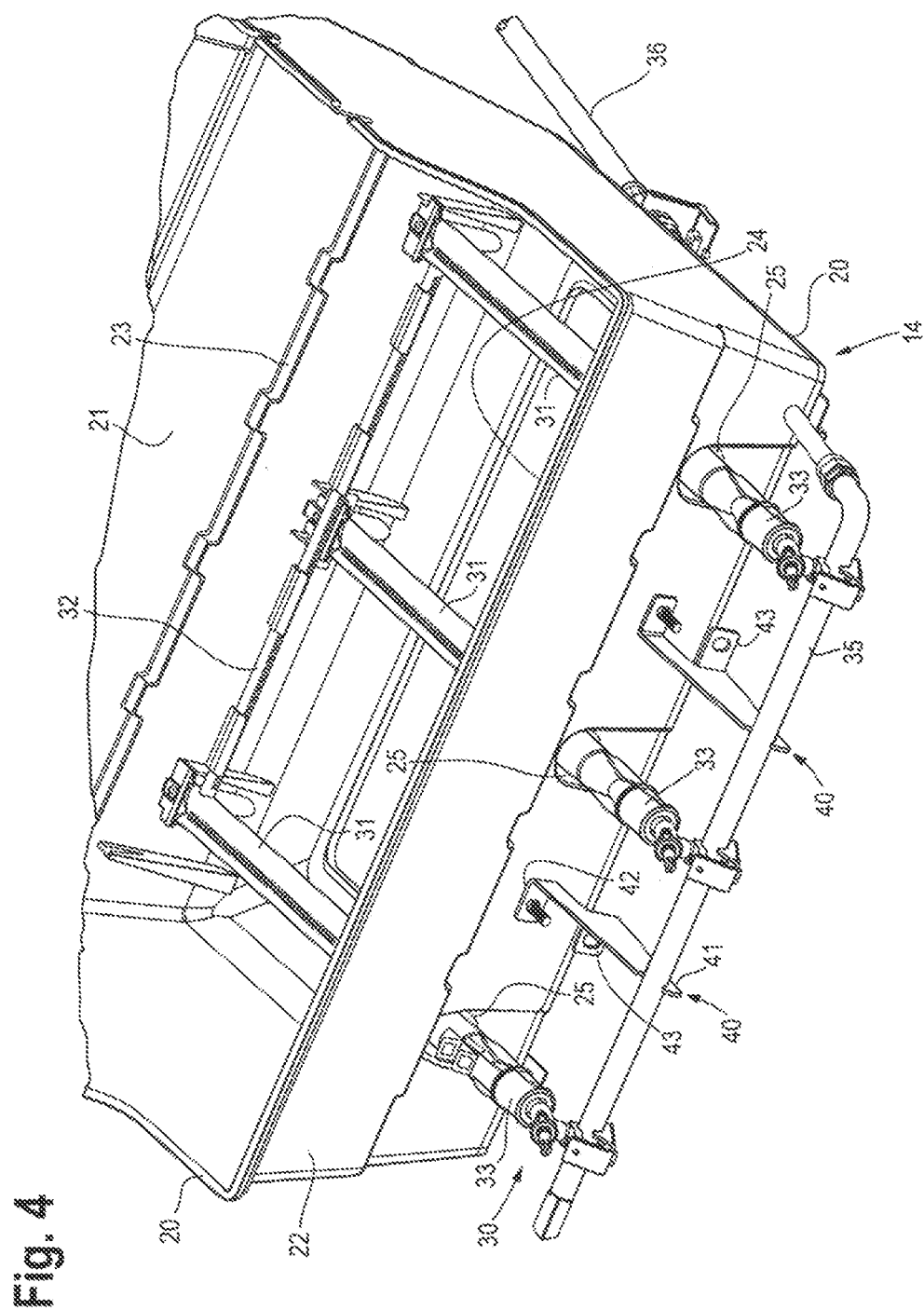
FIG. 4 is a perspective view of a typical fire box and gas supply and distribution assembly shown in the state in which it would typically be shipped, including a preferred embodiment of the present invention secured to the fire box.
Figure 5:
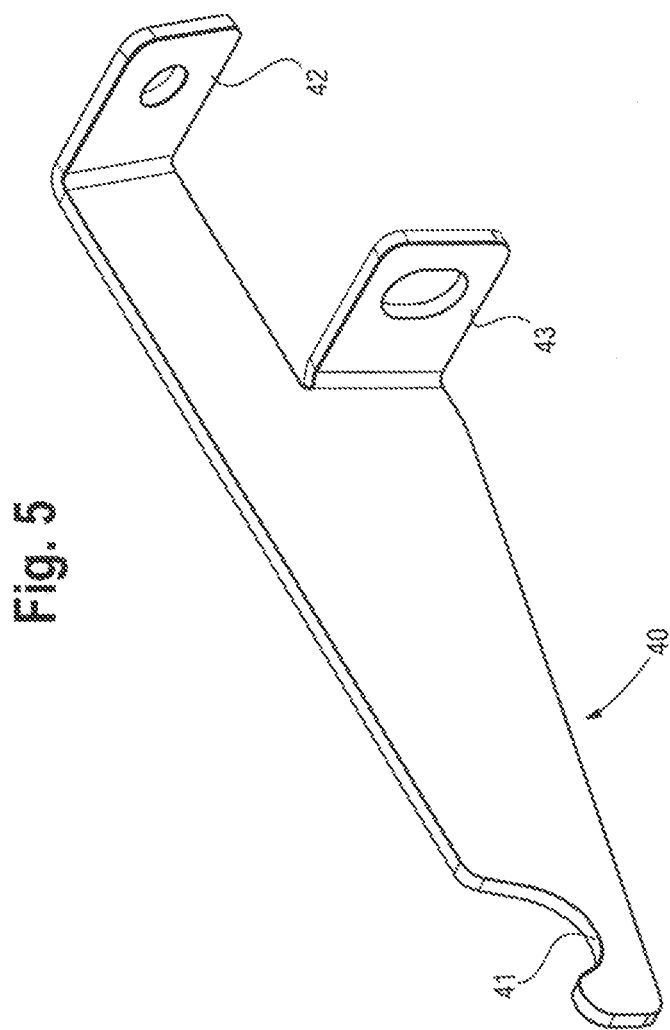
FIG. 5 is a perspective view of a preferred embodiment of the gas manifold mounting bracket of the present invention.

The typical gas supply and distribution assembly 30 and fire box 14 are shown in FIGS. 2-4. The fire box 14 includes two side walls 20, a back wall 21 and a front wall 22. Fire box 14 also includes a ledge 23 to accommodate sear bars (not shown) or other similar components. Fire box 14 also includes a lip 24, typically on the front 21 and back 22 walls to accommodate and support a cooking grate (not shown) or similar surface.

A typical gas supply and distribution assembly 30 includes burner tubes 31, a cross pilot tube 32 and gas valves 33. As shown in FIGS. 2 and 4, the burner tubes 31 are attached at one end to the rear wall 21 of fire box 14. The other end of burner tubes 31 protrude through holes 25 provided in the front wall 22 of fire box 14. Valves 33 are affixed to the ends of the burner tubes 31. Valves 33 are in turn attached to and in fluid communication with the gas distribution manifold 35. The gas distribution manifold 35, and components attached thereto, are supported by a gas manifold mounting bracket 40 of the present inventions as hereinafter described. A gas supply line 36 is also provided which is in fluid communication with the gas distribution manifold 35.

As will be understood by those of ordinary skill in the art, gas supply line 36 is ultimately connected to a gas source (not shown), such as a tank or gas line. In operation, gas flows from the gas source through the gas supply line 36 and into gas distribution manifold 35. As its name connotes, gas distribution manifold 35 distributes the gas through the selected valves 33 and to the burner tubes 31 where the gas is ignited and ultimately used for cooking.

The gas supply and distribution assembly 30, and particularly the gas distribution manifold 35, is supported by gas manifold mounting bracket 40. As shown in FIG. 2, a first end or manifold support portion 41 of mounting bracket 40 supports gas distribution manifold 35. A back end or fire box attachment portion 42 of mounting bracket 40 is adapted to be attached to the front wall 22 of fire box 14. In a preferred embodiment, tabs 44 are formed into back end 42 or fire box connection point and are secured to the fire box 14 by a nut and bolt. Those of ordinary skill will understand that the bracket 40 may take a variety of forms and be attached to the fire box 14 and gas distribution manifold 35 in a variety of ways consistent with the present inventions. It will also be understood that mounting bracket 40 may be made from a variety of materials consistent with its environment of use and safety and regulatory considerations.

Importantly, manifold bracket 40 is also adapted to provide a portion that may be secured to the grill frame assembly 12. As best shown in FIGS. 2 and 3, an intermediate or frame connection portion 43 of mounting bracket 40 is provided with a tab or similar means that is secured to the grill frame assembly by a nut and bolt or other well known means. It will be understood that the intermediate portion 43 may also take a variety of forms consistent with the present inventions. In this manner, the manifold mounting bracket 40 provides extra support and security by mounting the gas distribution manifold 35 simultaneously to both the fire box 14 and frame 12.

When a typical grill assembly is shipped in the usual partially assembled form, the fire box will preferably include the components shown in FIG. 4 pre-assembled. Specifically, the burner tubes 31, cross pilot tube 32, valves 33 and gas distribution manifold 35 supported by manifold mounting bracket 40 are preferably attached at the factory. As shown, gas manifold mounting bracket 40 is secured to fire box 14, but is not secured to frame assembly 12 when shipped. When the consumer assembles the support frame 12, they attach the fire box 14 (for example, as shown in FIG. 4) to the support frame 12. The consumer will then secure gas mounting manifold bracket 40 to the grill support frame as shown in FIGS. 2 and 3. It will be understood, however, that the foregoing is a desired application of the present inventions, but is not required.

The above description is not intended to limit the meaning of the words used in or the scope of the following claims that define the invention. Rather, it is contemplated that future modifications in structure, function or result will exist that are not substantial changes and that all such insubstantial changes in what is claimed are intended to be covered by the claims. Thus, while preferred embodiments of the present inventions have been illustrated and described, it will be understood that changes and modifications can be made without departing from the claimed invention. In addition, although the term "claimed invention" or "present invention" is sometimes used herein in the singular, it will be understood that there are a plurality of inventions as described and claimed.

Various features of the present inventions are set forth in the following claims.

What is claimed is:

1. In a gas grill having a fire box, the fire box including a front wall, a back wall and two side walls, a support frame for supporting the fire box and a plurality of mounting brackets for supporting a gas distribution manifold, each of said plurality of mounting brackets comprising:
   a manifold support portion for supporting the gas distribution manifold;
   a fire box attachment portion for securing said bracket to the front wall of said fire box, wherein said fire box attachment portion is substantially parallel to the front wall of said fire box; and,
   a frame attachment portion for securing said bracket to said support frame.

2. The mounting bracket of claim 1 wherein each said plurality of brackets is of unitary construction.

3. In a gas grill having a fire box with a front wall, a support frame assembly for supporting the fire box and a mounting bracket for supporting a gas distribution manifold, the mounting bracket comprising:
   a first end adapted to support the gas distribution manifold;
   a second end adapted for attachment to the front wall of the fire box, said second end having an attachment portion at substantially a right angle to the mounting bracket and which is generally parallel to the front wall of the fire box; and,
   an intermediate portion between said first end and said second end adapted for attachment to the support frame.

4. The mounting bracket of claim 3 wherein a plurality of brackets are provided.

5. In a gas grill having a fire box, the fire box having a front wall, a support frame for supporting the fire box and a plurality of one-piece mounting brackets for supporting a gas distribution manifold, each mounting bracket having a distal end and a proximal end, each mounting bracket comprising:
- a manifold support portion on the distal end of the mounting bracket for supporting the gas distribution manifold;
- a fire box attachment portion on the proximal end of the mounting bracket for securing the mounting bracket to the front wall of the fire box; and,
- a frame attachment portion between the distal end and proximal end of the mounting bracket for securing the mounting bracket to the support frame.

6. The mounting bracket of claim 5 wherein the frame attachment portion includes an integral tab adapted to be secured to the support frame.

\* \* \* \* \*